US012106163B2

United States Patent
Carr, Jr. et al.

(10) Patent No.: US 12,106,163 B2
(45) Date of Patent: Oct. 1, 2024

(54) METHOD AND SYSTEM FOR DISTRIBUTED APPLICATION PROGRAMMING INTERFACE MANAGEMENT

(71) Applicant: JPMorgan Chase Bank, N.A., New York, NY (US)

(72) Inventors: Richard R Carr, Jr., Wayne, PA (US); Jason Hess, Frisco, TX (US); Anupam Arora, Middletown, DE (US); Anita Luthra, Winston Salem, NC (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 71 days.

(21) Appl. No.: 17/652,522

(22) Filed: Feb. 25, 2022

(65) Prior Publication Data

US 2022/0276917 A1    Sep. 1, 2022

Related U.S. Application Data

(60) Provisional application No. 63/155,056, filed on Mar. 1, 2021.

(51) Int. Cl.
G06F 9/54    (2006.01)
G06F 8/65    (2018.01)

(52) U.S. Cl.
CPC ............. *G06F 9/547* (2013.01); *G06F 8/65* (2013.01)

(58) Field of Classification Search
CPC ... G06F 9/547; G06F 8/65; G06F 9/54; G06F 9/468
See application file for complete search history.

(56) References Cited

U.S. PATENT DOCUMENTS

| | | | |
|---|---|---|---|
| 2003/0012183 A1* | 1/2003 | Butler | H04L 12/6418 370/467 |
| 2003/0161296 A1* | 8/2003 | Butler | H04L 67/10 370/352 |
| 2005/0071512 A1* | 3/2005 | Kim | G06Q 20/341 710/1 |
| 2008/0284798 A1* | 11/2008 | Weybrew | G06T 15/503 345/629 |
| 2009/0072858 A1* | 3/2009 | D'Souza | H03K 19/177 326/47 |
| 2010/0235284 A1* | 9/2010 | Moore | G06Q 20/401 709/204 |
| 2011/0099068 A1* | 4/2011 | Takano | G06Q 30/0273 705/14.69 |
| 2012/0016681 A1* | 1/2012 | Joergensen | G06F 11/3409 709/224 |

(Continued)

*Primary Examiner* — Tuan C Dao
(74) *Attorney, Agent, or Firm* — GREENBLUM & BERNSTEIN, P.L.C.

(57) ABSTRACT

A method for facilitating distributed application programming interface (API) management by using an API gateway is disclosed. The method includes receiving, via a network interface, a request that includes a consumer request to access an API; approving the request based on a predetermined criterion; generating, based on a result of the approving, a credential that includes an access credential corresponding to the request; updating the API gateway with the credential; applying a setting to the API gateway based on the credential; and exposing a management API that corresponds to the API gateway.

20 Claims, 7 Drawing Sheets

(56) References Cited

U.S. PATENT DOCUMENTS

| | | | |
|---|---|---|---|
| 2014/0108451 A1* | 4/2014 | Lee | G06F 16/951 |
| | | | 707/770 |
| 2014/0115004 A1* | 4/2014 | Isaacs | G06Q 30/02 |
| | | | 707/784 |
| 2014/0307556 A1* | 10/2014 | Zhang | H04W 28/0231 |
| | | | 370/236 |
| 2016/0148097 A1* | 5/2016 | Genova, III | G06F 3/0484 |
| | | | 706/47 |
| 2017/0346724 A1* | 11/2017 | Calin | H04L 45/24 |
| 2018/0219959 A1* | 8/2018 | Bugenhagen | H04L 67/51 |
| 2018/0270211 A1* | 9/2018 | O'Kennedy | H04L 63/062 |
| 2019/0132259 A1* | 5/2019 | Kim | H04L 67/10 |
| 2019/0394032 A1* | 12/2019 | Vudathu | H04L 63/0428 |
| 2021/0117544 A1* | 4/2021 | Kurtz | G06F 21/567 |

\* cited by examiner

METHOD AND SYSTEM FOR DISTRIBUTED APPLICATION PROGRAMMING INTERFACE MANAGEMENT

CROSS-REFERENCE TO RELATED APPLICATIONS

This application claims the benefit of U.S. Provisional Patent Application Ser. No. 63/155,056, filed Mar. 1, 2021, which is hereby incorporated by reference in its entirety.

BACKGROUND

1. Field of the Disclosure

This technology generally relates to methods and systems for managing application programming interfaces (APIs), and more particularly to methods and systems for facilitating distributed API management by using an API gateway to provide access to a plurality of APIs in an API catalog.

2. Background Information

Many business entities utilize computing interfaces such as, for example, an application programming interface (API) to define interactions between numerous software components such as, for example, applications. The APIs serve as software intermediaries that allow the applications to communicate within a networked environment. In enterprise networked environments, vast numbers of APIs are required to facilitate business operations. Historically, management of the vast numbers of APIs using conventional techniques have resulted in varying degrees of success with respect to efficiency, functionality, and flexibility.

One drawback of using conventional techniques for managing APIs is that in many instances, a centralized API gateway is often limited by throughput capacity. Furthermore, the throughput capacity of a centralized API gateway is often dictated by the computing component that hosts the centralized API gateway. As a result, the throughput capacity of the centralized API gateway is inflexible and difficult to scale based on a given need. Additionally, self-servicing of a particular API by a developer is often not feasible via the centralized API gateway.

Therefore, there is a need for a distributed API gateway that manages a plurality of APIs developed by many different development teams as a singular, cohesive API as well as facilitate the self-servicing of each of the plurality of APIs by a developer.

SUMMARY

The present disclosure, through one or more of its various aspects, embodiments, and/or specific features or sub-components, provides, inter alia, various systems, servers, devices, methods, media, programs, and platforms for facilitating distributed API management by using an API gateway to provide access to a plurality of APIs in an API catalog.

According to an aspect of the present disclosure, a method for facilitating distributed application programming interface (API) management by using an API gateway is provided. The method is implemented by at least one processor. The method may include receiving, via a network interface, at least one request, the at least one request may include a consumer request to access at least one API; approving the at least one request based on at least one predetermined criterion; generating, based on a result of the approving, at least one credential, the at least one credential may include an access credential corresponding to the at least one request; updating the API gateway with the at least one credential; applying at least one setting to the API gateway based on the at least one credential; and exposing a management API that corresponds to the API gateway.

In accordance with an exemplary embodiment, the at least one API may be stored in an API store, the API store may correspond to at least one catalog that is connected to the API gateway.

In accordance with an exemplary embodiment, at least one API policy that is associated with each of the at least one API may be managed via the API store, the API policy may include a rate limiting policy that restricts accepted calls based on a predetermined threshold.

In accordance with an exemplary embodiment, at least one ingress path may be dynamically updated via the API store based on an optimized system performance routing rule to prevent network congestion at a corresponding node.

In accordance with an exemplary embodiment, the at least one predetermined criterion may include at least one governing rule that corresponds to at least one from among a business guideline, a regulatory guideline, and a technical guideline.

In accordance with an exemplary embodiment, the at least one setting may include at least one from among an authorization details setting and a consumer setting that corresponds to a specific consumer.

In accordance with an exemplary embodiment, the method may further include receiving, via the network interface, at least one call from a consumer, the at least one call may include an invocation request corresponding to the at least one API; authenticating the at least one call by using the at least one credential; generating at least one access token for the at least one call; and transmitting, via the network interface, the at least one access token to the consumer in response to the at least one call.

In accordance with an exemplary embodiment, the method may further include receiving, via the network interface, the at least one access token from the consumer; authorizing the at least one access token; and invoking, via the API gateway, the at least one API according to the at least one call based on a result of the authorizing.

In accordance with an exemplary embodiment, the API gateway may include a graphical user interface that enables a consumer to self-register at least one second API and store the registered at least one second API in at least one catalog.

According to an aspect of the present disclosure, a computing device configured to implement an execution of a method for facilitating distributed application programming interface (API) management by using an API gateway is disclosed. The computing device including a processor; a memory; and a communication interface coupled to each of the processor and the memory, wherein the processor may be configured to receive, via a network interface, at least one request, the at least one request may include a consumer request to access at least one API; approve the at least one request based on at least one predetermined criterion; generate, based on a result of the approving, at least one credential, the at least one credential may include an access credential that corresponds to the at least one request; update the API gateway with the at least one credential; apply at least one setting to the API gateway based on the at least one credential; and expose a management API that corresponds to the API gateway.

In accordance with an exemplary embodiment, the processor may be further configured to store the at least one API in an API store, the API store may correspond to at least one catalog that is connected to the API gateway.

In accordance with an exemplary embodiment, the processor may be further configured to manage at least one API policy that is associated with each of the at least one API via the API store, the API policy may include a rate limiting policy that restricts accepted calls based on a predetermined threshold.

In accordance with an exemplary embodiment, the processor may be further configured to dynamically update at least one ingress path via the API store based on an optimized system performance routing rule to prevent network congestion at a corresponding node.

In accordance with an exemplary embodiment, the at least one predetermined criterion may include at least one governing rule that corresponds to at least one from among a business guideline, a regulatory guideline, and a technical guideline.

In accordance with an exemplary embodiment, the at least one setting may include at least one from among an authorization details setting and a consumer setting that corresponds to a specific consumer.

In accordance with an exemplary embodiment, the processor may be further configured to receive, via the network interface, at least one call from a consumer, the at least one call may include an invocation request that corresponds to the at least one API; authenticate the at least one call by using the at least one credential; generate at least one access token for the at least one call; and transmit, via the network interface, the at least one access token to the consumer in response to the at least one call.

In accordance with an exemplary embodiment, the processor may be further configured to receive, via the network interface, the at least one access token from the consumer; authorize the at least one access token; and invoke, via the API gateway, the at least one API according to the at least one call based on a result of the authorizing.

In accordance with an exemplary embodiment, the API gateway may include a graphical user interface that enables a consumer to self-register at least one second API and store the registered at least one second API in at least one catalog.

According to an aspect of the present disclosure, a non-transitory computer readable storage medium storing instructions for facilitating distributed application programming interface (API) management by using an API gateway is disclosed. The storage medium including executable code which, when executed by a processor, may cause the processor to receive, via a network interface, at least one request, the at least one request may include a consumer request to access at least one API; approve the at least one request based on at least one predetermined criterion; generate, based on a result of the approving, at least one credential, the at least one credential may include an access credential that corresponds to the at least one request; update the API gateway with the at least one credential; apply at least one setting to the API gateway based on the at least one credential; and expose a management API that corresponds to the API gateway.

In accordance with an exemplary embodiment, when executed by the processor, the executable code may further cause the processor to store the at least one API in an API store, the API store may correspond to at least one catalog that is connected to the API gateway.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
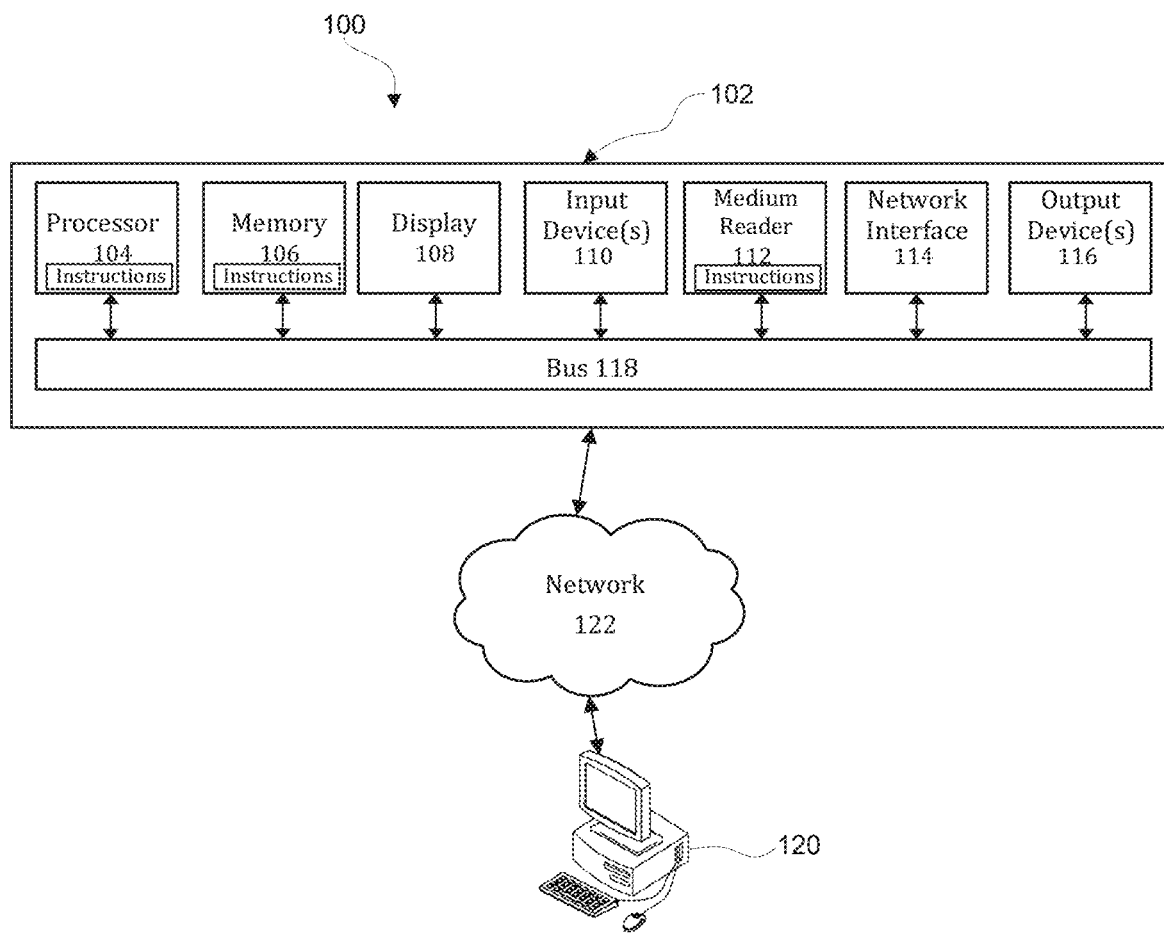
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed)

network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating distributed API management by using an API gateway to provide access to a plurality of APIs in an API catalog.

Figure 2:
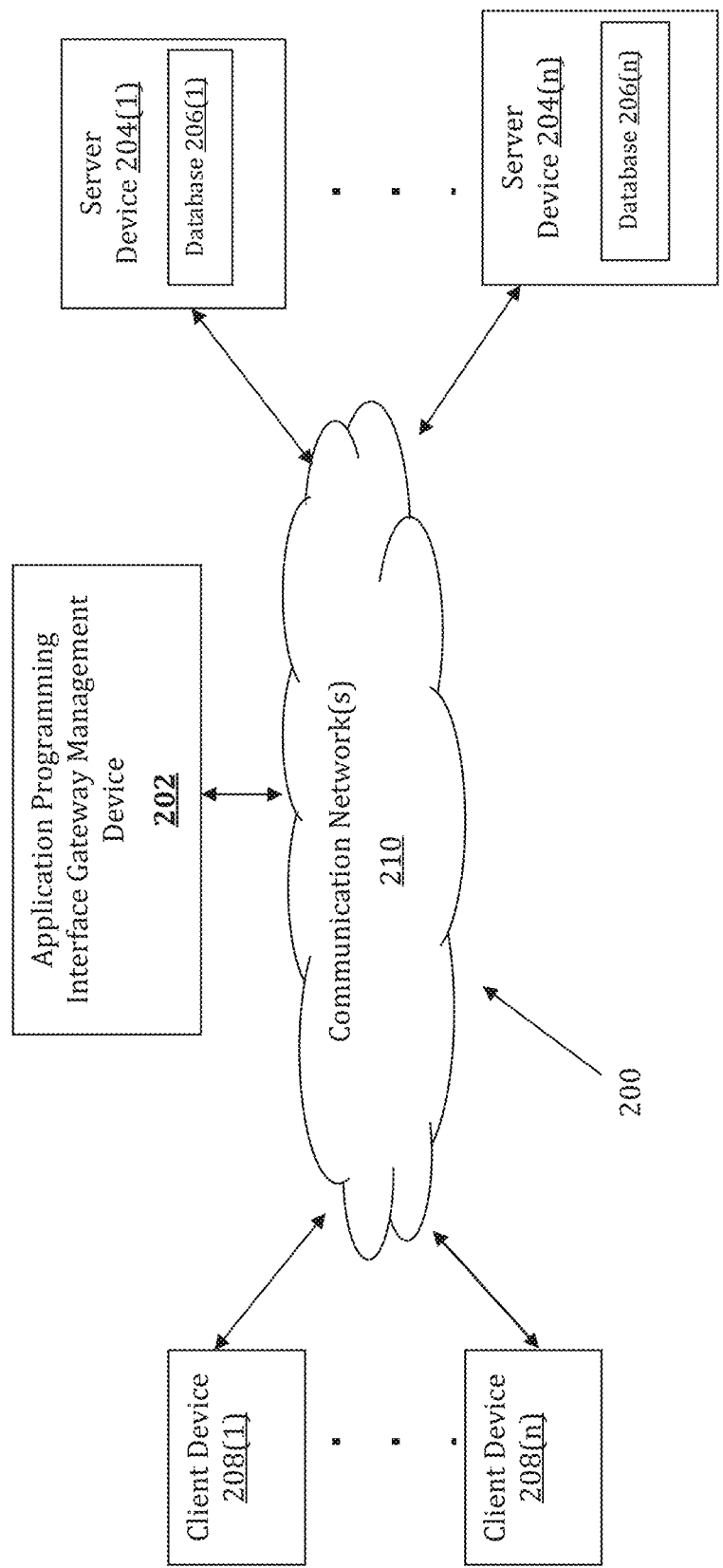
FIG. 2 illustrates an exemplary diagram of a network environment.

Referring to FIG. 2, a schematic of an exemplary network environment 200 for implementing a method for facilitating distributed API management by using an API gateway to provide access to a plurality of APIs in an API catalog is illustrated. In an exemplary embodiment, the method is executable on any networked computer platform, such as, for example, a personal computer (PC).

The method for facilitating distributed API management by using an API gateway to provide access to a plurality of APIs in an API catalog may be implemented by an Application Programming Interface Gateway Management (APIGM) device 202. The APIGM device 202 may be the same or similar to the computer system 102 as described with respect to FIG. 1. The APIGM device 202 may store one or more applications that can include executable instructions that, when executed by the APIGM device 202, cause the APIGM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the APIGM device 202 itself, may be located in virtual server(s) running in a cloud-based computing environment rather than being tied to one or more specific physical network computing devices. Also, the application(s) may be running in one or more virtual machines (VMs) executing on the APIGM device 202. Additionally, in one or more embodiments of this technology, virtual machine(s) running on the APIGM device 202 may be managed or supervised by a hypervisor.

In the network environment 200 of FIG. 2, the APIGM device 202 is coupled to a plurality of server devices 204(1)-204(n) that hosts a plurality of databases 206(1)-206(n), and also to a plurality of client devices 208(1)-208(n) via communication network(s) 210. A communication interface of the APIGM device 202, such as the network interface 114 of the computer system 102 of FIG. 1, operatively couples and communicates between the APIGM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the APIGM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and APIGM devices that efficiently implement a method for facilitating distributed API management by using an API gateway to provide access to a plurality of APIs in an API catalog.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The APIGM device 202 may be a standalone device or integrated with one or more other devices or apparatuses, such as one or more of the server devices 204(1)-204(n), for example. In one particular example, the APIGM device 202 may include or be hosted by one of the server devices 204(1)-204(n), and other arrangements are also possible. Moreover, one or more of the devices of the APIGM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the APIGM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a plurality of application programming interfaces, credentials, settings, rules, tokens, and access criteria.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the APIGM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the APIGM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the APIGM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the APIGM device 202, the server devices 204(1)-204(n), or the client devices 208(1)-208(n), for example, may be configured to operate as virtual instances on the same physical machine. In other words, one or more of the APIGM device 202, the server devices 204(1)-204(n), or the client devices 208(1)-208(n) may operate on the same physical device rather than as separate devices communicating through communication network(s) 210. Additionally, there may be more or fewer APIGM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
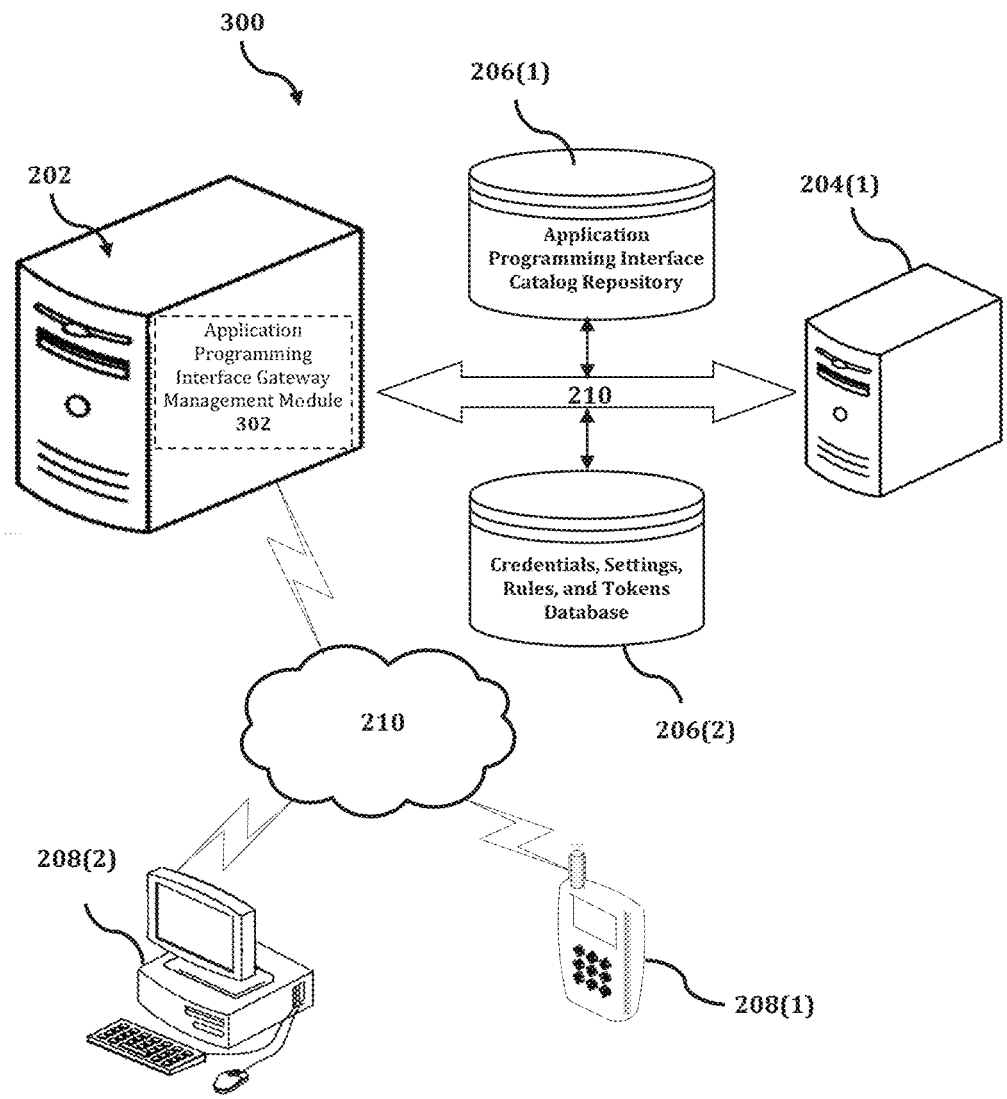
FIG. 3 shows an exemplary system for implementing a method for facilitating distributed API management by using an API gateway to provide access to a plurality of APIs in an API catalog.

The APIGM device 202 is described and shown in FIG. 3 as including an application programming interface (API) gateway management module 302, although it may include other rules, policies, modules, databases, or applications, for example. As will be described below, the API gateway management module 302 is configured to implement a method for facilitating distributed API management by using an API gateway to provide access to a plurality of APIs in an API catalog.

An exemplary process 300 for implementing a mechanism for facilitating distributed API management by using an API gateway to provide access to a plurality of APIs in an API catalog by utilizing the network environment of FIG. 2 is shown as being executed in FIG. 3. Specifically, a first client device 208(1) and a second client device 208(2) are illustrated as being in communication with APIGM device 202. In this regard, the first client device 208(1) and the second client device 208(2) may be "clients" of the APIGM device 202 and are described herein as such. Nevertheless, it is to be known and understood that the first client device 208(1) and/or the second client device 208(2) need not necessarily be "clients" of the APIGM device 202, or any entity described in association therewith herein. Any additional or alternative relationship may exist between either or both of the first client device 208(1) and the second client device 208(2) and the APIGM device 202, or no relationship may exist.

Further, APIGM device 202 is illustrated as being able to access an application programming interface catalog repository 206(1) and a credentials, settings, rules, and tokens database 206(2). The API gateway management module 302 may be configured to access these databases for implementing a method for facilitating distributed API management by using an API gateway to provide access to a plurality of APIs in an API catalog.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the APIGM device 202 via broadband or cellular communication. Of course, these embodiments are merely exemplary and are not limiting or exhaustive.

Upon being started, the API gateway management module 302 executes a process for facilitating distributed API management by using an API gateway to provide access to a plurality of APIs in an API catalog. An exemplary process for facilitating distributed API management by using an API gateway to provide access to a plurality of APIs in an API catalog is generally indicated at flowchart 400 in FIG. 4.

Figure 4:
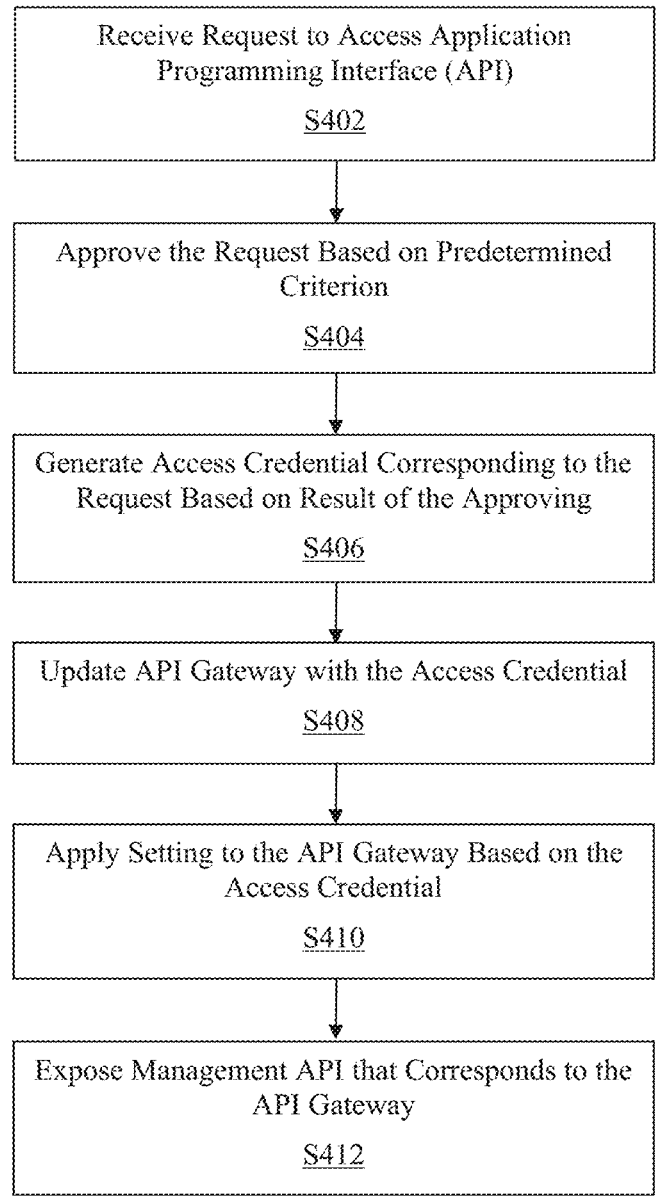
FIG. 4 is a flowchart of an exemplary process for implementing a method for facilitating distributed API management by using an API gateway to provide access to a plurality of APIs in an API catalog.

In the process 400 of FIG. 4, at step S402, a request may be received via a network interface. The request may include a consumer request to access a specific application programming interface (API). In an exemplary embodiment, the request may correspond to a specific API that is stored in a catalog. The catalog may include a storage component for persisting a plurality of APIs. In another exemplary embodiment, the catalog may be connected to an API gateway via the network interface.

In another exemplary embodiment, the API may relate to a computing interface that defines interactions between software components within a networked environment. The API may operate as an intermediary between computing components such as, for example, a plurality of applications. In another exemplary embodiment, the API may govern at least one from among a call and a request received from the consumer. The API may perform governing functions by defining the kinds of calls and requests the consumer may initiate with a system. The API may also define how the calls and requests are made, data formats that must be used, and technical conventions that must be followed. As will be appreciated by a person of ordinary skill in the art, the APIs simplify programming by abstracting underlying implementations and only exposing needed objects and actions.

In another exemplary embodiment, the request may be received via a graphical user interface that is connected to an API cataloging component such as, for example, an API store. For example, a consumer may utilize the graphical user interface to initiate a request with the API store for access to the specific API. In another exemplary embodiment, the API store may act as a catalog of a plurality of APIs that are currently available for consumption. The APIs in the catalog may be requested via the API store for a given client.

In another exemplary embodiment, the API store may manage API policy data such as for example, a rate limiting policy. The API policy data may correspond to predetermined policy that is implemented by a business entity and may relate to business objective, technical objectives, and regulatory objectives. In another exemplary embodiment, the API policy data in the API store may be updated and changed as required by an administrator. As will be appreciated by a person of ordinary skill in the art, the API store may implement the API policy data by ensuring that the plurality of APIs in storage satisfy the conditions set forth by the API policy data.

In another exemplary embodiment, the request may include a request from a consumer to self-register another API with the API store. The API store may orchestrate the fulfillment of the API on-boarding request. In another exemplary embodiment, the API store may require additional verification from a security and policy implementation service such as, for example, a cyber technology control (CTC) service. The API store may require additional verification from the security and policy implementation service when the request to on-board a particular API is received via a public network such as, for example, an internet network.

In another exemplary embodiment, the API store may update an authentication component for a plurality of managed API gateways. For example, the API store may be utilized to update authentication requirements for the plurality of managed API gateways without requiring a separate request to update each of the plurality of managed API gateways. In another exemplary embodiment, the API store may update ingress load balancers with appropriate domain and path-based routing rules such as, for example, a routing rule to optimize system performance. The API store may update ingress paths to a particular API based on current network conditions. For example, the API store may, based on an optimize system performance routing rule, update ingress paths to a particular API to prevent network congestion at a given node.

At step S404, the request may be approved by the API store based on a predetermined criterion. The API store may approve requests from consumers as well as maintain necessary rules and guidelines for the authentication. In an exemplary embodiment, the predetermined criterion may include rules that corresponds to at least one from among a business guideline, a regulatory guideline, and a technical guideline. The rules may relate to business guidelines such as, for example, guidelines that determine which set of consumers may access a particular API. Similarly, the rules may relate to regulatory guidelines such as, for example, guidelines that determine which data may be exposed by an API via a public network. The rules may also relate to technical guidelines such as, for example, guidelines that determine which APIs may be accessed by a particular consumer based on network throughput.

At step S406, credentials may be generated based on a result of the approval. The credentials may include an access credential that corresponds to the request. In an exemplary embodiment, the credentials may correspond to the consumer initiating the request. The credentials may include information relating to the consumer such as, for example, consumer access rights and consumer job functions. In another exemplary embodiment, the credentials may be generated by the API store based on a result of the approval. The credentials generated by the API store may be stored and maintained in an authentication component such as, for example, a digital authorization service.

At step S408, an API gateway may be updated with the generated credentials. In an exemplary embodiment, the API gateway may include an API management tool that sits between a consumer and a collection of backend services such as, for example, a plurality of APIs. The API gateway may act as a reverse proxy to accept all API calls and requests. In another exemplary embodiment, the API gateway may determine which APIs are required to fulfill the calls and requests. Based on the determination, the API gateway may then aggregate the required APIs and return an appropriate result in response to the calls and requests. In another exemplary embodiment, the API gateway may include a graphical user interface that enables a consumer to self-register an API and store the registered API in the API store.

In another exemplary embodiment, the API gateway may operate on a single computing node to manage APIs developed by a single development team. For example, the API gateway may be specifically associated with a particular API development team to serve as the API management tool for that API development team. In another exemplary embodiment, the API gateway may operate on a plurality of computing nodes such as, for example, in a distributed computing schema to manage all APIs developed across a business entity. The API gateway may also include a management API gateway that manages a plurality of API gateways. For example, a management API gateway may provide management functions across the plurality of API gateways to enable a singular, cohesive API for the business entity.

In another exemplary embodiment, the API store may update the API gateway with the generated credentials. The API store may update the API gateway with appropriate access by calling an API gateway management API to set authorization details and consumer specific settings such as, for example, a rate limit associated with the consumer.

At step S410, a setting may be applied to the API gateway based on the generated credentials. In an exemplary embodiment, the API store may apply the setting to the API gateway by using the API gateway management API. The API store may apply the settings to the API gateway based on the generated credentials to enable access to the consumer as well as ensuring that the API gateway provides appropriate access. In another exemplary embodiment, the setting may include at least one from among an authorization details setting and a consumer setting that corresponds to a specific consumer.

At step S412, a management API that corresponds to the API gateway may be exposed. In an exemplary embodiment, the management API may include a computing interface that defines interactions between a consumer and the API gateway. The management API may define the kinds of calls that can be made to the API gateway, how these calls are made, the data formats required to make these calls, and the technical conventions that must be followed to make these calls with the API gateway. As will be appreciated by a person of ordinary skill in the art, the management API may define interactions between a consumer and an API gateway as well as between a consumer and a management API gateway such as, for example, an API gateway for a plurality of API gateways consistent with embodiments in the present application.

In another exemplary embodiment, a call may be received from a consumer via a network interface. The call may include an invocation request that corresponds to the specific API. The call may then be authenticated by using the credential. Based on a result of the authenticating, an access token may be generated for the call. The generated access token may be transmitted via a network interface to the consumer in response to the call.

In another exemplary embodiment, the access token may be received from the consumer via the network interface. The access token may be authorized by an authorization component. Then, based on a result of the authorizing, the specific API may be invoked via the API gateway according to the call.

In another exemplary embodiment, the consumer may call an API endpoint for authentication by using the generated credentials. The consumer call may be authenticated via a custom authorizing service which returns an access token to the consumer. The consumer may then call the API endpoint with the access token. The API gateway may authorize the token received from the API endpoint via the custom authorizing service. Then, the API gateway may invoke the requested API after applying consumer specific policies and attributes. The requested API may generate a response which the API gateway returns to the consumer according to the call.

In another exemplary embodiment, the API gateway may be opinionated and may expose a protected management API that allows an API management platform coupled with an API store to effect change on the API gateway in support of consumer on-boarding. The opinionated API gateway may be provisioned by any application team that wishes to provision an API for consumption. To expose the API, the application team may register the API with a centralized application store by providing details on the management of an API endpoint. On-boarding consumers to the API may now be performed via the API store, which will leverage the management API to update consumer specific settings.

In another exemplary embodiment, the distributed API gateway may enable application teams to self-service provisioning of APIs while delegating API access management to a centralized hub. The distributed API gateway may construct a management API that is portable to a variety of cloud vendors to leverage public cloud elasticity for scalability and resilience. In another exemplary embodiment, the distributed API gateway may reduce overhead relating to management of infrastructure by leveraging serverless components and simple cost models for API gateway usage. The distributed API gateway may eliminate constraints such as, for example, throughput constrains and account endpoint constraints of a single, centralized implementation.

Figure 5:
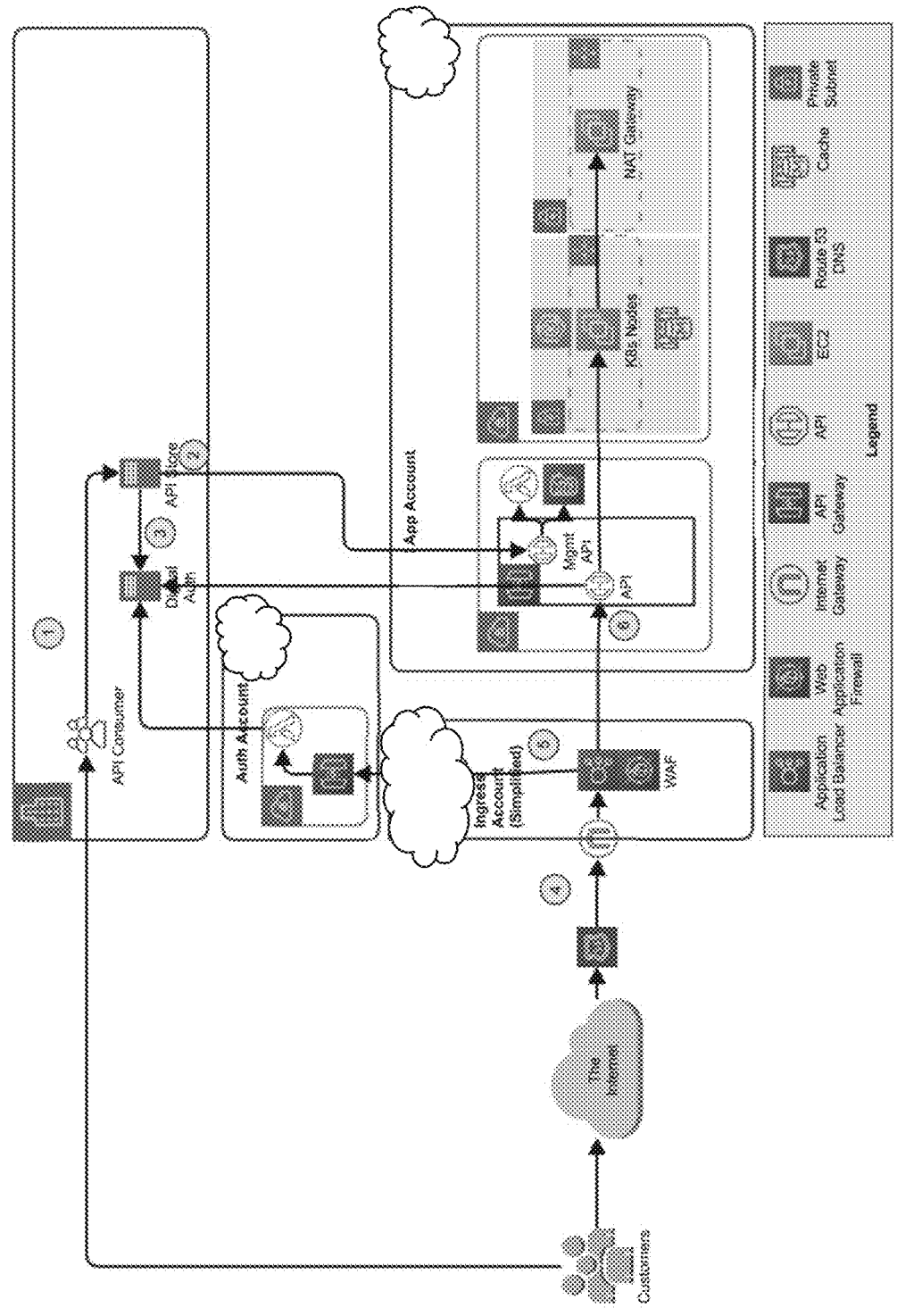
FIG. 5 is a flow diagram that illustrates a process for accessing an API that is usable for implementing a method for facilitating distributed API management by using an API gateway to provide access to a plurality of APIs in an API catalog, according to an exemplary embodiment.

FIG. 5 is a flow diagram 500 that illustrates a process for accessing an API that is usable for implementing a method for facilitating distributed API management by using an API gateway to provide access to a plurality of APIs in an API catalog, according to an exemplary embodiment. In flow diagram 500, the customer may access an API via a public network such as, for example, an internet network. As will be appreciated by a person of ordinary skill in the art, the process for accessing an API may also apply to an access request from a private network consistent with embodiments in the present disclosure.

As illustrated in FIG. 5, at step 1, a consumer may use an API store to request access to a particular API in an API catalog. In another exemplary embodiment, the consumer may access the API store via a graphical user interface that allows self-registration of a plurality of APIs. At step 2, the API store may determine whether the access request is approved based on predetermined criteria. Upon approval of the access request, the API store generates credentials relating to consumer access via an authorization service such as, for example, the digital authorization service.

At step 3, the API store updates an API gateway with appropriate access by calling a management API corresponding to the API gateway. The management API may set authorization details and customer specific settings such as, for example, a rate limiting setting. At step 4, the consumer calls an API endpoint for authentication based on the generated credentials. The API store may authenticate the call via a custom authorizer service such as, for example, an authorization account API gateway and returns an access token. The consumer may then call the API endpoint with the received access token.

At step 5, the API gateway may authorize the token via the custom authorizer service. At step 6, the API gateway, based on a result of the authorizing, may invoke the requested API after applying customer specific policies and attributes. The API gateway may then return an indication to the consumer in response to the access request.

Figure 6:
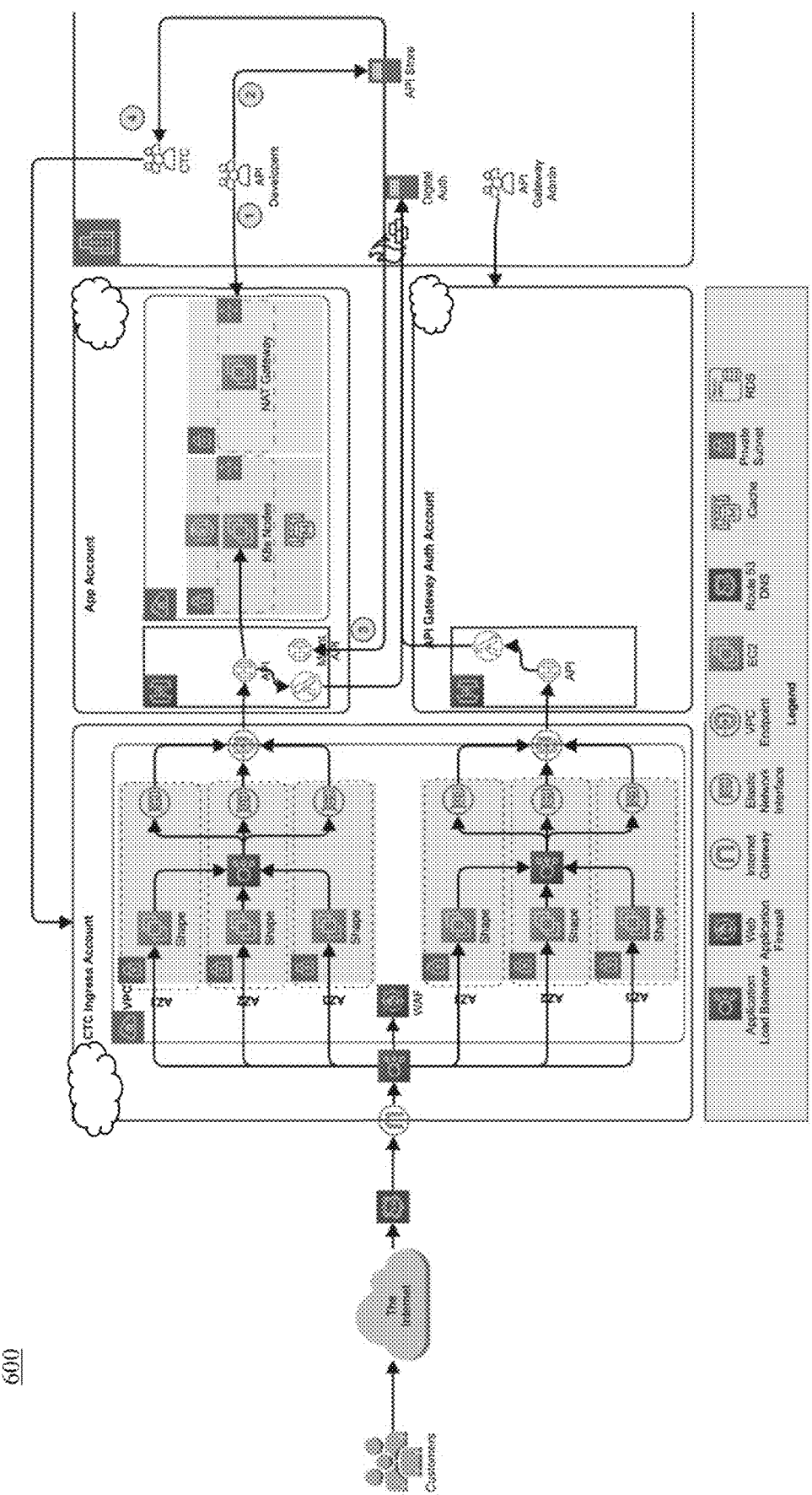
FIG. 6 is a flow diagram that illustrates a process for registering an API that is usable for implementing a method for facilitating distributed API management by using an API gateway to provide access to a plurality of APIs in an API catalog, according to an exemplary embodiment.

FIG. 6 is a flow diagram 600 that illustrates a process for registering an API that is usable for implementing a method for facilitating distributed API management by using an API gateway to provide access to a plurality of APIs in an API catalog, according to an exemplary embodiment.

As illustrated in FIG. 6, at step 1, an API developer may create and deploy an opinionated API gateway to an account belonging to the API developer. The API developer may deploy an API to the API gateway as well as deploy a compute service to handle the API requests. Flow diagram 600 illustrates a microservice titled "K8s node" however, the target may include any valid compute service. In an exemplary embodiment, the deployment of the API may be automated via a developer continuous integration/continuous deployment (CI/CD) pipeline script. The CI/CD pipeline script may call an opinionated gateway terraform module. The deployment process of the opinionated API gateway may result in a return of certain values. In another exemplary embodiment, the API store may be automatically notified that a new API has been provisioned.

At step 2, the API developer may register a new API with the API store by providing details corresponding to the values returned as a result of the process in step 1. The API developer may also provide details relating to the API such as, for example, what the API is, what the API does, and what operations may the API perform. At step 3, the API store may call a management API endpoint on the deployed API gateway to validate the API and configure any relevant policies.

At step 4, based on a result of the validating, the API store may notify a policy implementation service such as, for example, a cyber technology control (CTC) service via a queue to deploy changes to the ingress account. At step 5, the CTC service may deploy the updates to infrastructure components to support API ingress. To accomplish this, the CTC service may establish virtual private cloud endpoints to an API account when the API account is newly created. The CTC service may then update path-based routing on the application load balancer to target the API via the virtual private cloud endpoints.

Figure 7:
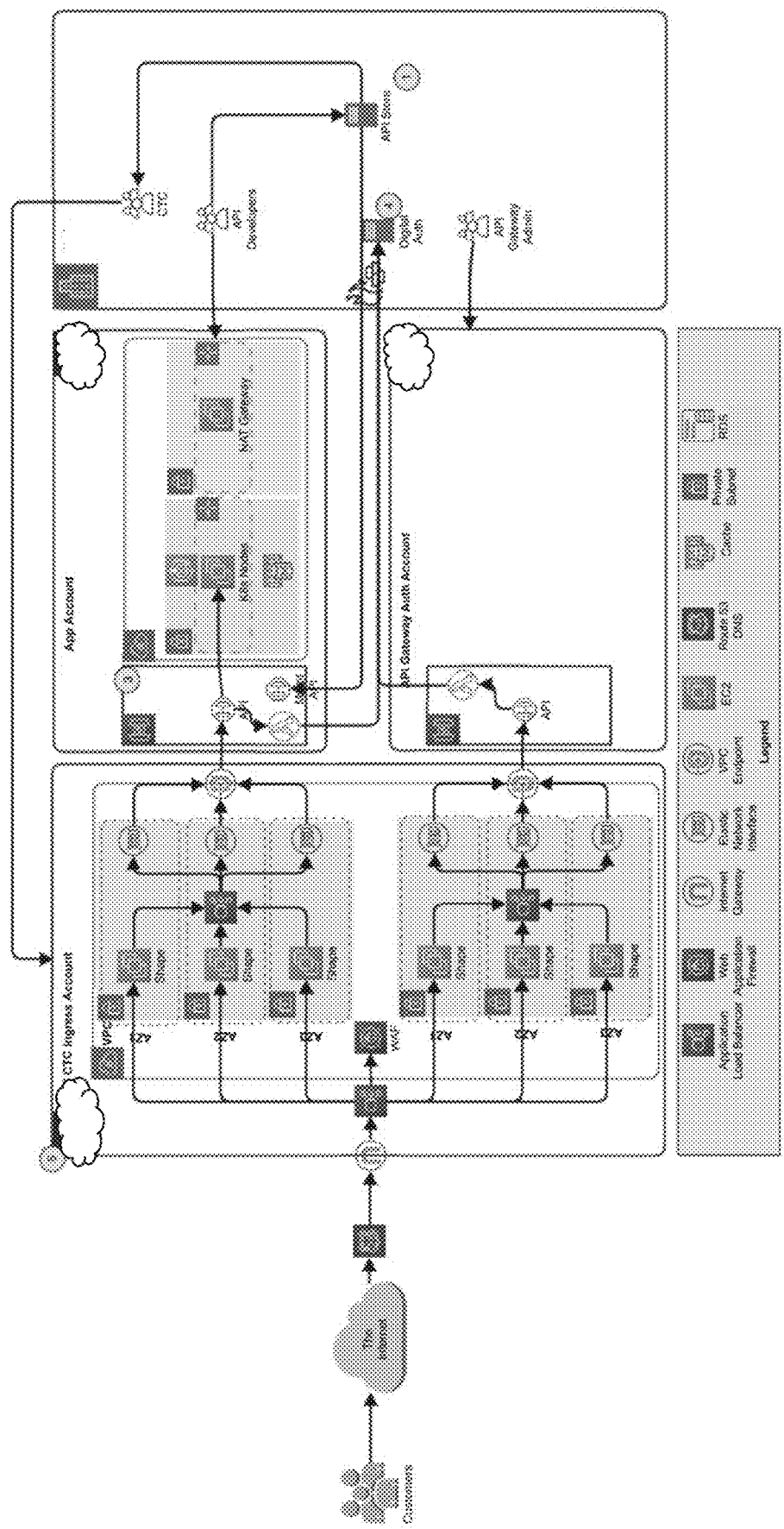
FIG. 7 is a flow diagram that illustrates components that are usable for implementing a method for facilitating distributed API management by using an API gateway to provide access to a plurality of APIs in an API catalog, according to an exemplary embodiment.

FIG. 7 is a flow diagram 700 that illustrates components that are usable for implementing a method for facilitating distributed API management by using an API gateway to provide access to a plurality of APIs in an API catalog, according to an exemplary embodiment.

As illustrated in FIG. 7, component 1 may correspond to an API store. The API store may act as a catalog of APIs available for consumption. The available APIs may be requested via the API store for a given client. The API store may also manage API policy data such as, for example, a rate limiting policy. Similarly, the API store must orchestrate the fulfillment of API on-boarding requests. The API store may receive CRC requests when the API store is internet facing. In another exemplary embodiment, the API store may update an authentication store for the managed gateways as well as update the ingress load balancers with appropriate domain and path-based routing rules.

Component 2 may correspond to an API console that aggregates log data from a plurality of API gateways. The API console may also be configured to display API usage metrics. Component 3 may correspond to an API gateway authorization account. The API gateway authorization account may be utilized to host an API gateway that serves as an authentication API for all distributed APIs. The API gateway authorization account may also create and return a token that the consumer may use to call a specified API.

Component 4 may correspond to a managed API gateway product such as, for example, an opinionated API gateway service product. The managed API gateway product may include a self-service product that API developers may deploy to a developer account to manage APIs belonging to the developer. The managed API gateway product may enforce policy as well as expose a management API that enables updating of API gateway policies such as, for example, an authorization configuration policy and a rate limiting policy. In an exemplary embodiment, the managed API gateway product may be pre-configured with a custom lambda authorizer.

Component 5 may correspond to an API gateway authentication and authorization store. The API gateway authentication and authorization store may be shared between all API gateways and may include a digital authorization service. Component 6 may correspond to an internet-edge management account. The internet-edge management account may protect the APIs via a web application firewall by routing requests to appropriate APIs according to path-based routing.

Accordingly, with this technology, an optimized process for facilitating distributed API management by using an API gateway to provide access to a plurality of APIs in an API catalog is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating distributed application programming interface (API) management by using an API gateway, the method being implemented by at least one processor, the method comprising:
   automatically deploying, by the at least one processor, at least one API to at least one catalog by,
      initiating, by the at least one processor, a development pipeline script that calls an opinionated gateway terraform module,
      wherein the opinionated gateway terraform module automatically deploys the at least one API together with a corresponding compute service that processes at least one API request;
   receiving, by the at least one processor via a network interface, at least one request, the at least one request including a consumer request to access the at least one API from among a plurality of APIs that are stored in the at least one catalog,
      wherein the at least one catalog corresponds to a storage component that persists the plurality of APIs;
   approving, by the at least one processor, the at least one request based on at least one predetermined criterion,
      wherein the at least one predetermined criterion includes a type of data that can be exposed by the at least one API via a public network;
   generating, by the at least one processor based on a result of the approving, at least one credential, the at least one credential including an access credential that corresponds to the at least one request,
      wherein the access credential includes information that relates to at least one consumer access right and at least one consumer job function;
   updating, by the at least one processor, the API gateway with the at least one credential,
      wherein the API gateway operates on a plurality of computing nodes in a distributed computing schema;
   applying, by the at least one processor, at least one setting to the API gateway based on the at least one credential; and
   exposing, by the at least one processor, a management API that corresponds to the API gateway.

2. The method of claim 1, wherein the at least one API is stored in an API store, the API store corresponding to the at least one catalog that is connected to the API gateway.

3. The method of claim 2, wherein at least one API policy that is associated with each of the at least one API is managed via the API store, the API policy including a rate limiting policy that restricts accepted calls based on a predetermined threshold.

4. The method of claim 2, wherein at least one ingress path is dynamically updated via the API store based on an optimized system performance routing rule to prevent network congestion at a corresponding node.

5. The method of claim 1, wherein the at least one predetermined criterion includes at least one governing rule that corresponds to at least one from among a business guideline, a regulatory guideline, and a technical guideline.

6. The method of claim 1, wherein the at least one setting includes at least one from among an authorization details setting and a consumer setting that corresponds to a specific consumer.

7. The method of claim 1, further comprising:
receiving, by the at least one processor via the network interface, at least one call from a consumer, the at least one call including an invocation request that corresponds to the at least one API;
authenticating, by the at least one processor, the at least one call by using the at least one credential;
generating, by the at least one processor, at least one access token for the at least one call; and
transmitting, by the at least one processor via the network interface, the at least one access token to the consumer in response to the at least one call.

8. The method of claim 7, further comprising:
receiving, by the at least one processor via the network interface, the at least one access token from the consumer;
authorizing, by the at least one processor, the at least one access token; and
invoking, by the at least one processor via the API gateway, the at least one API according to the at least one call based on a result of the authorizing.

9. The method of claim 1, wherein the API gateway includes a graphical user interface that enables a consumer to self-register at least one second API and store the registered at least one second API in the at least one catalog.

10. A computing device configured to implement an execution of a method for facilitating distributed application programming interface (API) management by using an API gateway, the computing device comprising:
a processor;
a memory; and
a communication interface coupled to each of the processor and the memory,
wherein the processor is configured to:
automatically deploy at least one API to at least one catalog by further configuring the processor to:
initiate a development pipeline script that calls an opinionated gateway terraform module,
wherein the opinionated gateway terraform module automatically deploys the at least one API together with a corresponding compute service that processes at least one API request;
receive, via a network interface, at least one request, the at least one request including a consumer request to access the at least one API from among a plurality of APIs that are stored in the at least one catalog,
wherein the at least one catalog corresponds to a storage component that persists the plurality of APIs;
approve the at least one request based on at least one predetermined criterion,
wherein the at least one predetermined criterion includes a type of data that can be exposed by the at least one API via a public network;
generate, based on a result of the approving, at least one credential, the at least one credential including an access credential that corresponds to the at least one request,
wherein the access credential includes information that relates to at least one consumer access right and at least one consumer job function;
update the API gateway with the at least one credential,
wherein the API gateway operates on a plurality of computing nodes in a distributed computing schema;
apply at least one setting to the API gateway based on the at least one credential; and
expose a management API that corresponds to the API gateway.

11. The computing device of claim 10, wherein the processor is further configured to store the at least one API in an API store, the API store corresponding to the at least one catalog that is connected to the API gateway.

12. The computing device of claim 11, wherein the processor is further configured to manage at least one API policy that is associated with each of the at least one API via the API store, the API policy including a rate limiting policy that restricts accepted calls based on a predetermined threshold.

13. The computing device of claim 11, wherein the processor is further configured to dynamically update at least one ingress path via the API store based on an optimized system performance routing rule to prevent network congestion at a corresponding node.

14. The computing device of claim 10, wherein the at least one predetermined criterion includes at least one governing rule that corresponds to at least one from among a business guideline, a regulatory guideline, and a technical guideline.

15. The computing device of claim 10, wherein the at least one setting includes at least one from among an authorization details setting and a consumer setting that corresponds to a specific consumer.

16. The computing device of claim 10, wherein the processor is further configured to:
receive, via the network interface, at least one call from a consumer, the at least one call including an invocation request that corresponds to the at least one API;
authenticate the at least one call by using the at least one credential;
generate at least one access token for the at least one call; and
transmit, via the network interface, the at least one access token to the consumer in response to the at least one call.

17. The computing device of claim 16, wherein the processor is further configured to:
receive, via the network interface, the at least one access token from the consumer;
authorize the at least one access token; and
invoke, via the API gateway, the at least one API according to the at least one call based on a result of the authorizing.

18. The computing device of claim 10, wherein the API gateway includes a graphical user interface that enables a consumer to self-register at least one second API and store the registered at least one second API in the at least one catalog.

19. A non-transitory computer readable storage medium storing instructions for facilitating distributed application programming interface (API) management by using an API gateway, the storage medium comprising executable code which, when executed by a processor, causes the processor to:
- automatically deploy at least one API to at least one catalog by further causing the processor to:
  - initiate a development pipeline script that calls an opinionated gateway terraform module,
  - wherein the opinionated gateway terraform module automatically deploys the at least one API together with a corresponding compute service that processes at least one API request;
- receive, via a network interface, at least one request, the at least one request including a consumer request to access the at least one API from among a plurality of APIs that are stored in the at least one catalog,
  - wherein the at least one catalog corresponds to a storage component that persists the plurality of APIs;
- approve the at least one request based on at least one predetermined criterion,
  - wherein the at least one predetermined criterion includes a type of data that can be exposed by the at least one API via a public network;
- generate, based on a result of the approving, at least one credential, the at least one credential including an access credential that corresponds to the at least one request,
  - wherein the access credential includes information that relates to at least one consumer access right and at least one consumer job function;
- update the API gateway with the at least one credential,
  - wherein the API gateway operates on a plurality of computing nodes in a distributed computing schema;
- apply at least one setting to the API gateway based on the at least one credential; and
- expose a management API that corresponds to the API gateway.

20. The storage medium of claim 19, wherein, when executed by the processor, the executable code further causes the processor to store the at least one API in an API store, the API store corresponding to the at least one catalog that is connected to the API gateway.

* * * * *